United States Patent
Moriya (12)

(10) Patent No.: US 9,192,869 B2
(45) Date of Patent: Nov. 24, 2015

(54) AUTONOMOUS MOBILE ROBOT SYSTEM

(75) Inventor: Toshio Moriya, Tokyo (JP)

(73) Assignee: Hitachi, Ltd., Tokyo (JP)

(*) Notice: Subject to any disclaimer, the term of this patent is extended or adjusted under 35 U.S.C. 154(b) by 999 days.

(21) Appl. No.: 12/478,400

(22) Filed: Jun. 4, 2009

(65) Prior Publication Data

US 2009/0326713 A1    Dec. 31, 2009

(30) Foreign Application Priority Data

Jun. 9, 2008    (JP) .................................. 2008-150707

(51) Int. Cl.
| | |
|---|---|
| G05B 19/04 | (2006.01) |
| A63H 17/00 | (2006.01) |
| B25J 9/16 | (2006.01) |
| G05D 1/02 | (2006.01) |

(52) U.S. Cl.
CPC ............. *A63H 17/00* (2013.01); *B25J 9/1676* (2013.01); *G05D 1/0214* (2013.01); *G05D 1/0238* (2013.01); *G05D 1/0274* (2013.01); *A63H 2200/00* (2013.01); *G05B 2219/39085* (2013.01)

(58) Field of Classification Search
CPC ............ A47L 2201/00; A47L 2201/04; A47L 2201/06; B25J 13/086; B25J 13/087; B25J 13/088; B25J 13/089; B25J 19/02; B25J 19/021; B25J 19/022; B25J 19/023; B25J 19/025; B25J 19/026; B25J 19/027; B25J 19/028; B25J 19/04; B25J 9/0003; B25J 9/1664; B25J 9/1666; B25J 9/1676; G05D 1/0238; G05D 1/0274

USPC ................................ 701/2, 25, 301; 901/1, 46
See application file for complete search history.

(56) References Cited

U.S. PATENT DOCUMENTS

| | | | |
|---|---|---|---|
| 7,539,557 B2 * | 5/2009 | Yamauchi .................... | 700/245 |
| 2004/0167669 A1 * | 8/2004 | Karlsson et al. ............. | 700/259 |
| 2007/0156286 A1 * | 7/2007 | Yamauchi .................... | 700/245 |
| 2008/0033649 A1 * | 2/2008 | Hasegawa et al. ........... | 701/301 |
| 2010/0017046 A1 * | 1/2010 | Cheung et al. ............... | 701/2 |

FOREIGN PATENT DOCUMENTS

| | | |
|---|---|---|
| JP | 2004-098233 | 4/2004 |
| JP | 2005-326944 | 11/2005 |
| JP | 2007-066045 | 3/2007 |
| JP | 2007-122304 | 5/2007 |

OTHER PUBLICATIONS

Ota et al., "Introduction to Intelligent Robots," Corona Publishing Co., Ltd., Jan. 15, 2001, 43 Sheets, (English Translation 23 Sheets).

* cited by examiner

*Primary Examiner* — Jerrah Edwards
(74) *Attorney, Agent, or Firm* — Foley & Lardner LLP

(57) ABSTRACT

The possibilities of collision of a mobile robot with objects can be reduced significantly in actual robot movements. In an aspect of the present invention, there is provided an autonomous mobile robot system including a mobile robot and a computing system. The mobile robot includes: a sensing section for measuring surrounding conditions of the mobile robot; a position-posture estimating section for estimating position-posture data from sensing data obtained by the sensing section and an environmental map; and a robot moving section for controlling movements of the mobile robot according to movement control data determined from the position-posture data thus estimated and movement route data.

25 Claims, 21 Drawing Sheets

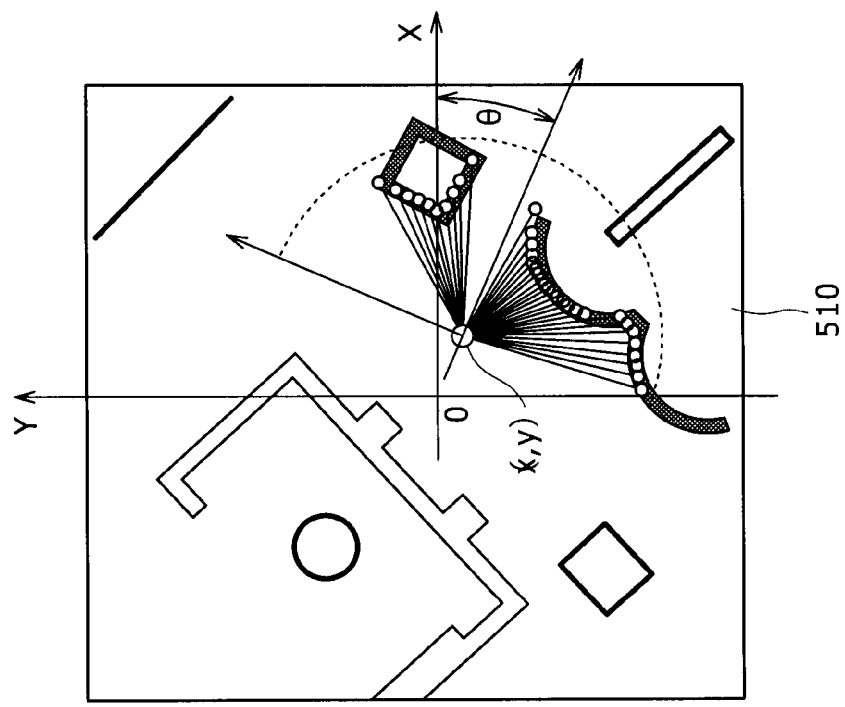
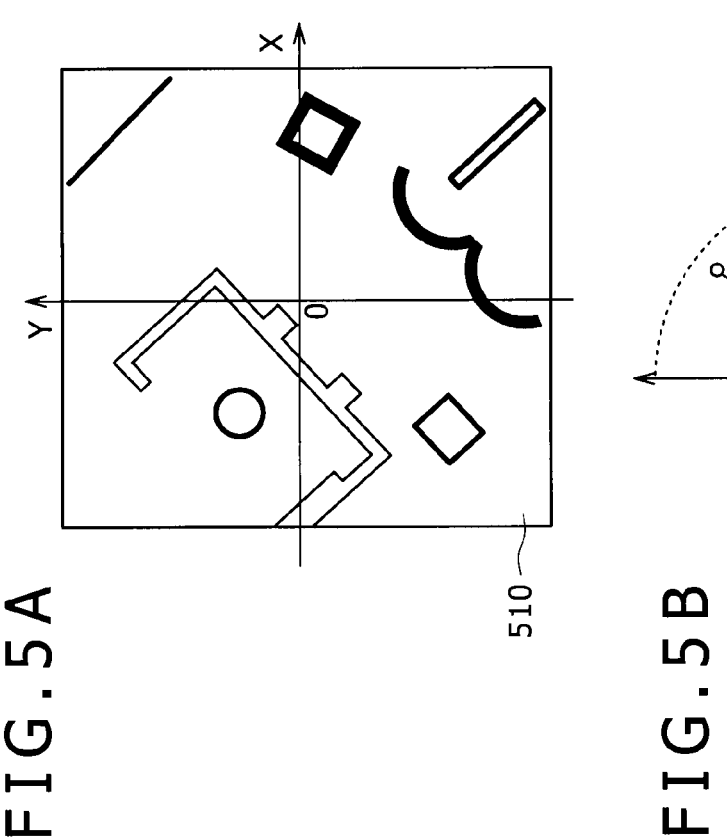
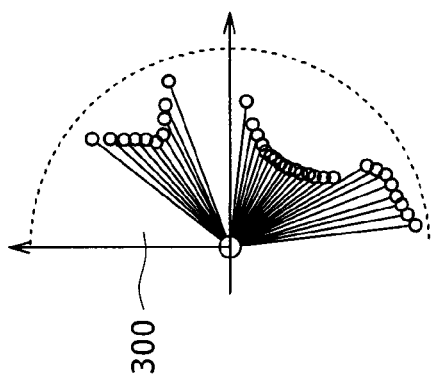
FIG.5C
FIG.5A
FIG.5B

AUTONOMOUS MOBILE ROBOT SYSTEM

This application claims priority from Japanese Patent Application 2008-150707, filed on Jun. 9, 2008. The entire content of the aforementioned application is incorporated herein by reference.

BACKGROUND OF THE INVENTION

The present invention relates to an autonomous mobile robot system in which a mobile robot thereof moves autonomously to a destination of interest without human operation.

In a known arrangement for an autonomous mobile robot system, movement route data defining movement loci to be taken by a mobile robot thereof can be generated automatically. For example, in Japanese Unexamined Patent Publication No. 2004-98233 ("Autonomous Mobile Robot"), there is disclosed a technique in which an optimal movement route with respect to cost and time of movement is formed by using means for specifying a start point of movement and an end point thereof, means for searching for a plurality of movement routes from the start point to the end point, and means for determining the best one of the movement routes on the basis of movement cost and time required for each of the movement routes.

SUMMARY OF THE INVENTION

As mentioned above, in a conventional technique for an autonomous mobile robot system, a mobile robot thereof can autonomously perform fundamental operations for movement to a destination of interest under movement control based on preset movement route data.

However, the conventional technique mentioned above is designed on the presumption that the mobile robot is used under ideal conditions. That is, it is presumed that no error is contained in sensor data and that the mobile robot is controllable or movable as instructed. Possible occurrences of errors, adverse effects due to unintended robot movements, and problematic possibilities caused by unpredictable conditions are not taken into consideration in the conventional technique.

It is therefore an object of the present invention to provide an autonomous mobile robot system in which movement route data and other parameter data to be used by a mobile robot for movement thereof are pre-adjusted to reduce the possibilities of collision with objects due to such causes as control errors.

In accomplishing this object of the present invention and according to one aspect thereof, there is provided an autonomous mobile robot system having: a mobile robot; and a computing system; wherein the mobile robot includes: a sensing section for measuring surrounding conditions of the mobile robot; a position-posture estimating section for estimating position-posture data from sensing data obtained by the sensing section and an environmental map; and a robot moving section for controlling movements of the mobile robot according to movement control data determined from the position-posture data thus estimated and movement route data; and wherein the computing system includes: an environmental map generating section for generating an environmental map indicating environmental geometric conditions including objects present in an environment where the mobile robot is to move around; a movement route data creating section for creating movement route data for movements of the mobile robot in a coordinate scheme of the environmental map; and a predictive collision probability parameter calculating section for determining a value of a collision probability parameter indicating a level of predictive probability of collision of the mobile robot with an object in mobile robot movements with inclusion of control errors through calculation by using robot composition information regarding the mobile robot, the environmental map thus prepared, and the movement route data thus created.

Further, according to another aspect of the present invention, the predictive collision probability parameter calculating section of the computing system simulates movements of the mobile robot with inclusion of control errors by using a virtual mobile robot corresponding to the mobile robot, the virtual mobile robot being defined in the computing system, and the predictive collision probability parameter calculating section determines a value of a collision probability parameter indicating a level of predictive probability of collision of the virtual mobile robot with an object in virtual mobile robot movements determined by using the robot composition information, environmental map, and movement route data.

Still further, according to another aspect of the present invention, the predictive collision probability parameter calculating section of the computing system includes: a movement control data calculating simulator for calculating control data of the virtual mobile robot from an estimated position-posture value indicating an estimated position-posture state on the environmental map, in combination with the movement route data, and the robot composition information; a robot movement simulator for calculating a value of a position-posture parameter of the virtual mobile robot from the control data calculated by the movement control data calculating simulator in combination with the robot composition information; and a collision probability calculating section for calculating a value of the collision probability parameter of the virtual mobile robot from a value of the position-posture parameter calculated by the robot movement simulator, in combination with the environmental map, and the robot composition information.

Still further, according to another aspect of the present invention, there is provided a small-type mobile robot that has a smaller size than that of the mobile robot and includes functional features of the computing system mentioned above, wherein the small-type mobile robot includes: a second sensing section for measuring surrounding conditions of the small-type mobile robot; a second position-posture estimating section for estimating a position-posture value of the small-type mobile robot from sensing data obtained by the second sensing section and the environmental map; and a second robot moving section for controlling movements of the small-type mobile robot according to movement control data determined from the estimated position-posture value and movement route data.

Furthermore, according to another aspect of the present invention, there is provided an autonomous mobile robot system having: a mobile robot; and a small-type mobile robot having a smaller size than that of the mobile robot; wherein the mobile robot includes: a sensing section for measuring surrounding conditions of the mobile robot; a position-posture estimating section for estimating position-posture data from sensing data obtained by the sensing section and an environmental map; and a robot moving section for controlling movement of the mobile robot according to movement control data determined from the position-posture data thus estimated and movement route data; and wherein the small-type mobile robot includes: an environmental map generating section for generating an environment map indicating environmental geometric conditions including objects present in an environment where the mobile robot is to move around; a movement route data creating section for creating movement route data for movements of the mobile robot in a coordinate scheme of the environmental map; a predictive collision probability parameter calculating section for determining a value of a collision probability parameter indicating a level of predictive probability of collision of the mobile robot with an object in mobile robot movements with inclusion of control errors through calculation by using robot composition information regarding the mobile robot, the environmental map thus prepared, and the movement route data thus created, a second sensing section for measuring surrounding conditions of the small-type mobile robot; a second position-posture estimating section for estimating a position-posture value of the small-type mobile robot from sensing data obtained by the second sensing section and the environmental map; and a second robot moving section for controlling movements of the-small-type mobile robot prior to movements of the mobile robot according to movement control data determined from the estimated position-posture value and movement route data.

In the above-mentioned technique according to the present invention, the possibilities of collision with objects in actual robot movements can be reduced significantly.

These and other features, objects and advantages of the present invention will become more apparent from the following description when taken in conjunction with the accompanying drawings.

BRIEF DESCRIPTION OF THE DRAWINGS

FIGS. 5A to 5C are explanatory diagrams showing an overall scheme of matching check processing through use of the environmental map and sensing data;

DESCRIPTION OF THE EMBODIMENTS

The present invention will now be described below in detail by way of example with reference to the accompanying drawings. According to a preferred embodiment of the present invention, there is provided an autonomous mobile robot system in which a mobile robot having a distance sensor or the like for measuring surrounding conditions thereof estimates a self position-posture state thereof through use of sensing data obtained by the distance sensor and an environmental map indicating environmental geometric conditions, and the mobile robot carries out autonomous movement control thereof based on the result of the estimation thus performed. More particularly, in the autonomous mobile robot system according to the present preferred embodiment, a collision probability parameter representing a possibility of collision of the mobile robot with an object is determined through simulation of robot movements with inclusion of control errors by using a virtual mobile robot formed on the basis of virtual definitions of the mobile robot in actuality. Since movement route data of the mobile robot has to be determined or modified in accordance with collision probability parameter data, it is necessary to determine the collision probability parameter data before (at least immediately before) movements of the mobile robot by using the movement route data.

Figure 2:
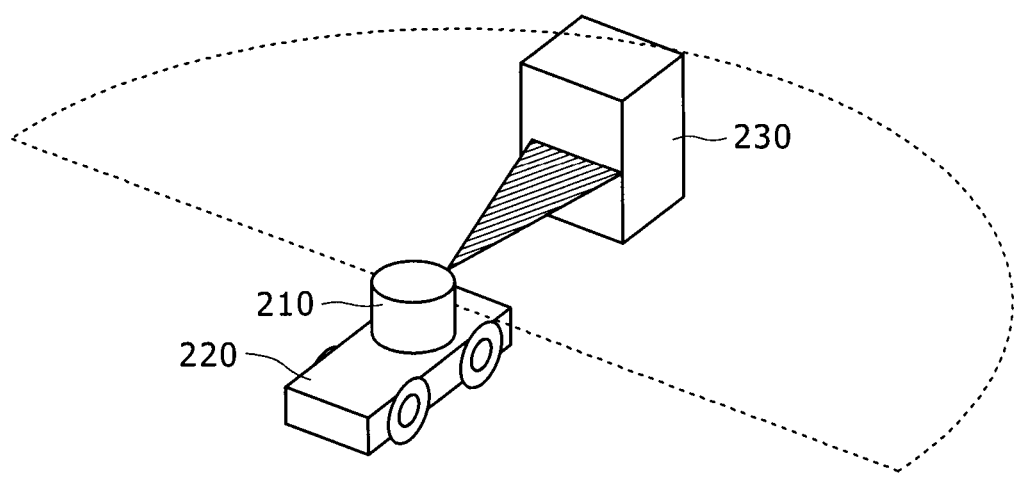
FIG. 2 is a diagram showing a measuring range of a distance sensor.

First, the following describes position-posture estimation processing to be performed for the mobile robot by using a distance sensor thereof and an environmental map. The term "distance sensor" refers to a device for measuring a distance to an object in each of a multiplicity of directions in a surrounding area thereof. As shown in FIG. 2 in which a measuring range of a distance sensor (210) is illustrated, the distance sensor (210) is capable of instantaneously measuring a distance to an object (230) on a horizontal plane at a certain height level in each of a total of 181 different directions over the azimuth angle range of −90° to +90° in increments of 1° with respect to the front side of the distance sensor (210). As illustrated, the distance sensor (210) is equipped on a mobile robot (220).

Figure 3:
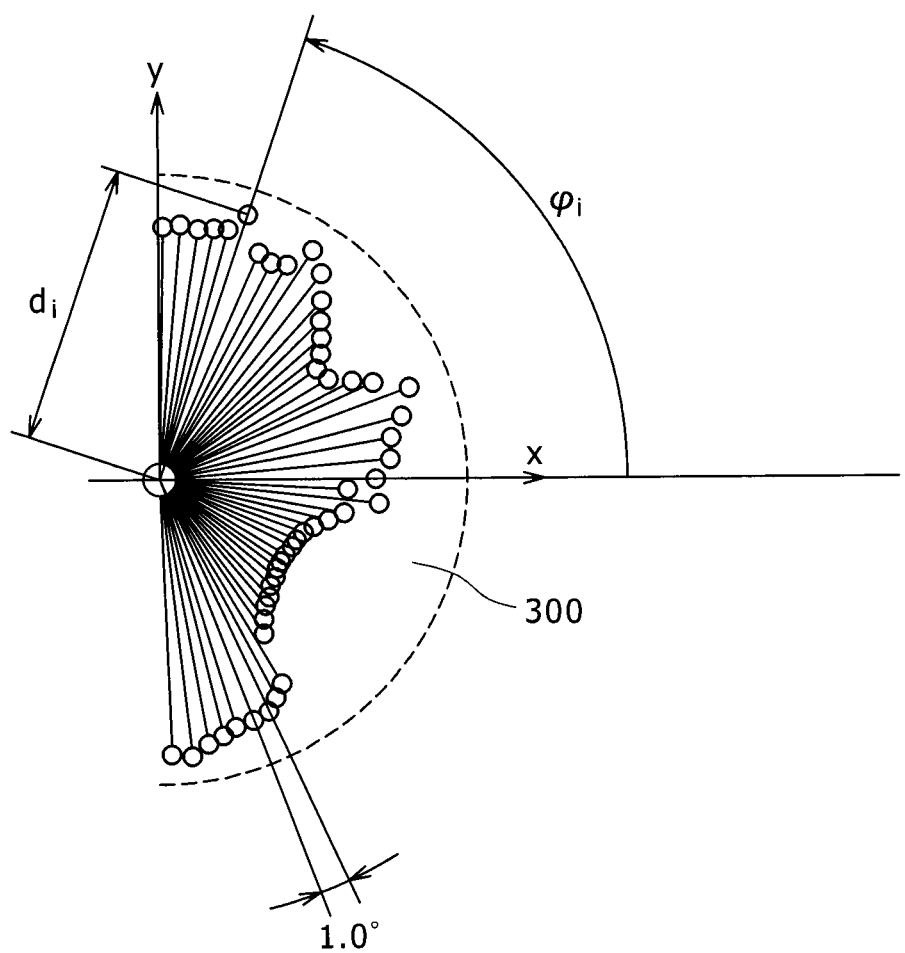
FIG. 3 is a diagram showing an example of sensing data measured by using the distance sensor.

FIG. 3 shows an example of sensing data measured by using the distance sensor (210). Each sensing data is represented in a combination of an angle "$\phi$" and a distance "d" as a form of "$(\phi_0, d_0), (\phi_1, d_1), \ldots, (\phi_i, d_i)$" and so forth. The subscript "$i$" of each variable denotes a data number; "$\phi_i$"

indicates an "i"th measurement direction, and "$d_i$" indicates a distance to an object in a direction "$\phi_i$". Since the distance sensor (210) is capable of measuring a distance in each of a total of 181 different directions over the azimuth angle range of −90° to +90° in increments of 1° with respect to the front side thereof as mentioned above, distance measurement can be carried out at each of the following angles; "$\phi_0=-90°$, $\phi_1=-89°, \ldots, \phi_1=+90°$".

Figure 4:
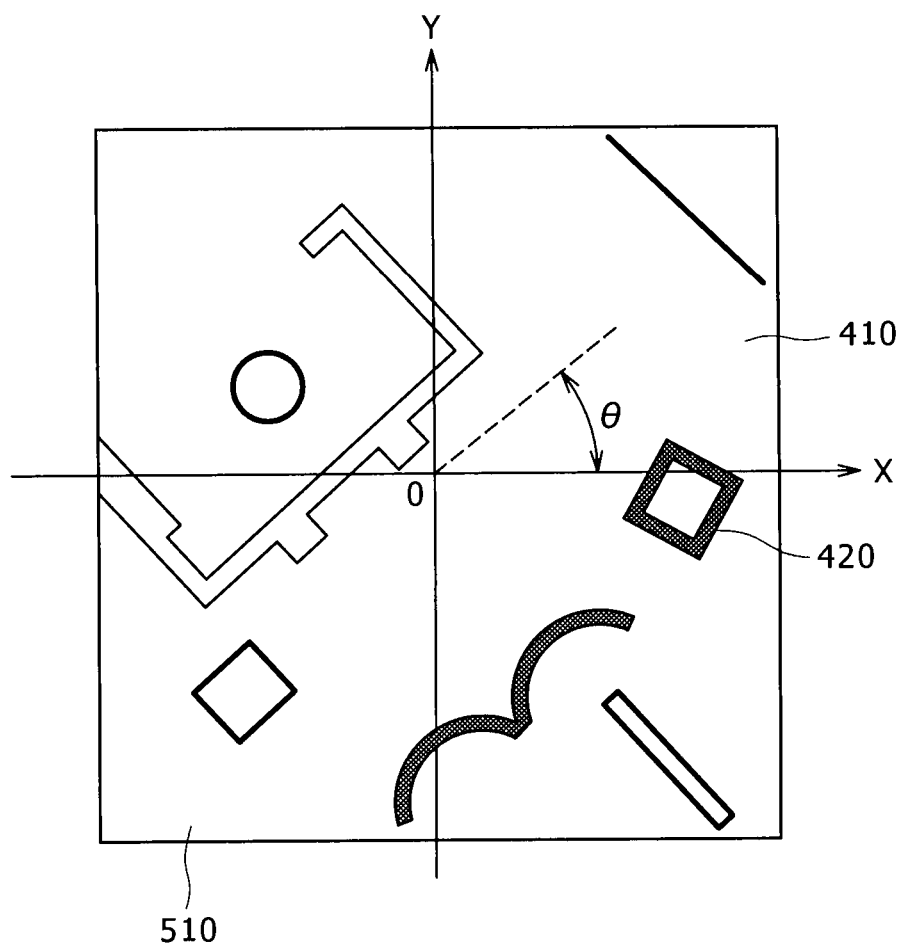
FIG. 4 is an example of an environmental map used for position-posture estimation processing.

The term "environmental map" refers to a two-dimensional digital image indicating the presence of each object on a cross section at a certain height level in measurement conducted by the distance sensor (210) as shown in FIG. 4. In the present preferred embodiment, the absence of an object is represented as a blank region (410), and the presence of an object is represented as a solid-line profile (420) as exemplified in FIG. 4.

The mobile robot (220) moves around on a flat ground or floor. Regarding the degrees of freedom in a position-posture state that varies with movements thereof, a total of three parameters are provided; two parameters for a position "(x, y)" of the mobile robot (220), and one parameter for an angle of movement direction "θ" thereof. It is to be noted that a coordinate scheme representing these parameters conforms to a coordinate scheme representing an environmental map (510) shown in FIG. 4.

In estimation of a position-posture state of the mobile robot (220), the above-noted three parameters (x, y, θ) are to be determined from sensing data of the mobile robot (220) having an arbitrary position-posture state. An operation of matching check processing to be performed for position-posture estimation of the mobile robot (220) is described below.

In the matching check processing, while varying position and posture (direction) values of sensing data measured in a certain frame (a frame of sensing data measured in each of a total of 181 different directions in increments of 1° over the azimuth angle range of −90° to +90° with respect to the front side of the distance sensor (210)), the sensing data is overlaid on the environmental map (510) to find out a position-posture state indicating a best possible match between the sensing data and the environmental map (510). The position-posture state thus found out is used to provide estimated values of position-posture data of the mobile robot (220). Thus, position-posture estimation is carried out based on the principle that, in a particular position-posture state of the mobile robot (220), the same sensing data as that measured currently should be obtained at the highest level of probability.

Referring to FIGS. 5A to 5C, there is illustrated an overall scheme of the matching check processing to be performed on the principle mentioned above. FIG. 5C shows a situation in which a best possible match is recognized in the above manner when the environmental map (510) and sensing data (300) are given. A combination of a parallel movement component (x, y) and a rotation component θ under this condition is used as an estimated position-posture value of the mobile robot (220).

Figure 6:
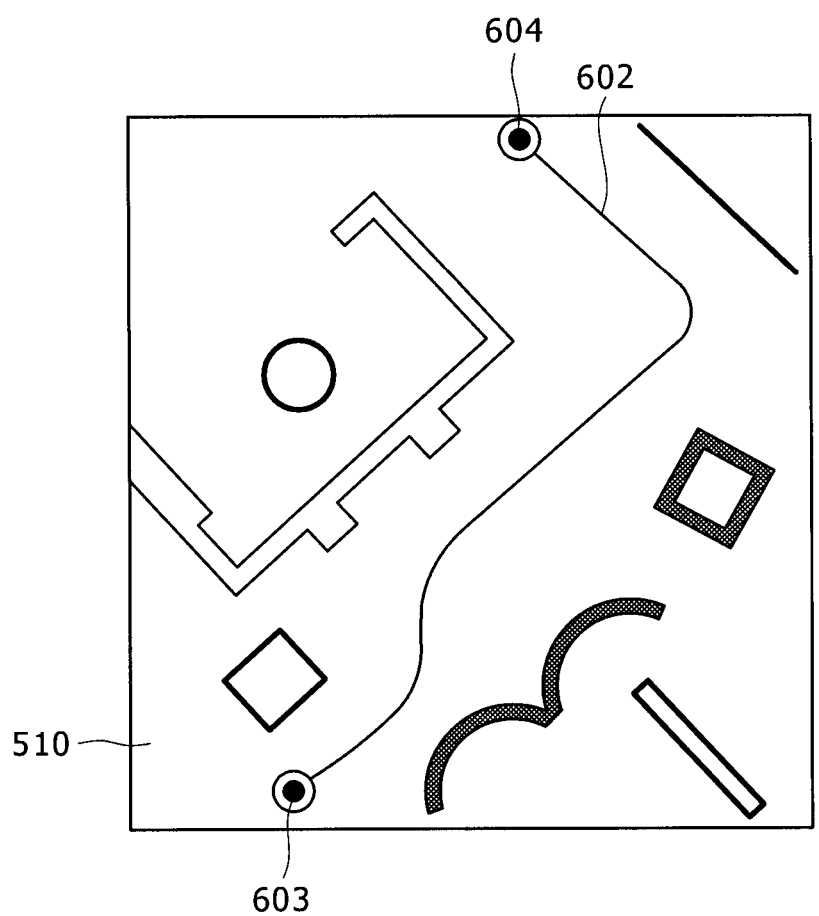
FIG. 6 is a diagram showing an example of a movement route defined on the environmental map.

Then, the following describes movement route data which defines movement loci to be taken by the mobile robot (220). The term "movement route data" refers to numerical data regarding on-map movement routes that are indicated as straight lines or curved lines corresponding to movement loci to be taken by the mobile robot (220). FIG. 6 shows an example of a curved line corresponding to a robot movement locus. In FIG. 6, a start point (603) indicates the current position of the mobile robot (220), and a goal point (604) indicates the point of destination in the movement of interest. A curved line (602) extending from the start point (603) to the goal point (604) represents the movement route to be taken by the mobile robot (220). More specifically, in data description of this movement route, dot-plotting is performed at a high density along the movement route (including straight paths and curved paths), and on-map coordinate values at respective points are successively represented in the form of "(x_0, y_0), (x_1, Y_1), ..., (x_e, y_e)". In this form of coordinate representation, (x_0, y_0) indicates the start point (603), and (x_e, y_e) indicates the goal point (604).

While the mobile robot (220) determines position-posture data thereof in succession by the above-mentioned method of position-posture estimation, the mobile robot (220) compares the position-posture data thus determined with data of the movement route to be taken. Thus, the mobile robot (220) determines a direction and speed of movement thereof, and accordingly, the mobile robot (220) controls movement mechanisms thereof to carry out the movement of interest.

Figure 7:
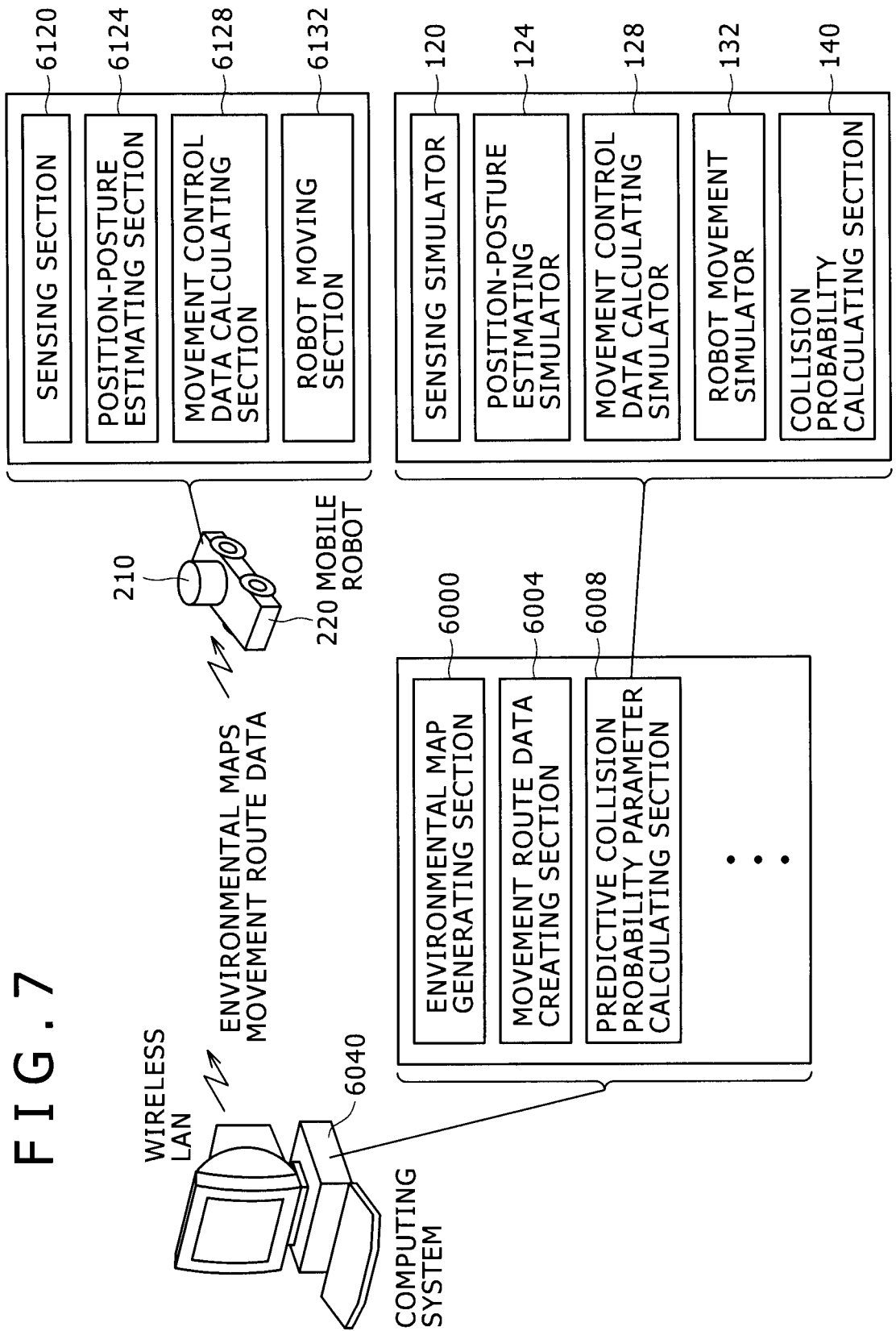
FIG. 7 is a diagram showing an autonomous mobile robot system configuration according to a preferred embodiment of the present invention.

FIG. 7 shows the configuration of the autonomous mobile robot system according to the present preferred embodiment. The autonomous mobile robot system includes: a mobile robot (220), having wheels or the like, capable of moving around in arbitrary directions on a flat floor in a real environment; and a computing system (6040) such as a personal computer capable of creating environment maps and movement route data.

The mobile robot (220) serves to perform such tasks as carrying an article or a plurality of articles by moving around autonomously. The mobile robot (220) is equipped with a sensor (210) or a distance sensor such as mentioned above for sensing surrounding environmental conditions. Further, a personal computer or a computing function facility capable of performing data processing equivalent to that thereon is incorporated in the mobile robot (220). The mobile robot (220) includes a sensing section (6120), a position-posture estimating section (6124), a movement control data calculating section (6128), and a robot moving section (6132).

The sensing section (6120) includes the sensor (210) or a distance sensor such as mentioned above. The position-posture estimating section (6124) and the movement control data calculating section (6128) are provided in implementation of the computing function facility incorporated in the mobile robot (220). The robot moving section (6132) includes drive mechanisms such as motors and control devices therefor incorporated in the mobile robot (220). The mobile robot (220) acquires sensing data through the sensing section (6120), and receives environmental maps from the computing system (6040) via a wireless LAN or the like. Using the sensing data and environmental maps, the position-posture estimating section (6124) estimates current position-posture data in succession in a manner exemplified above.

Figure 8:
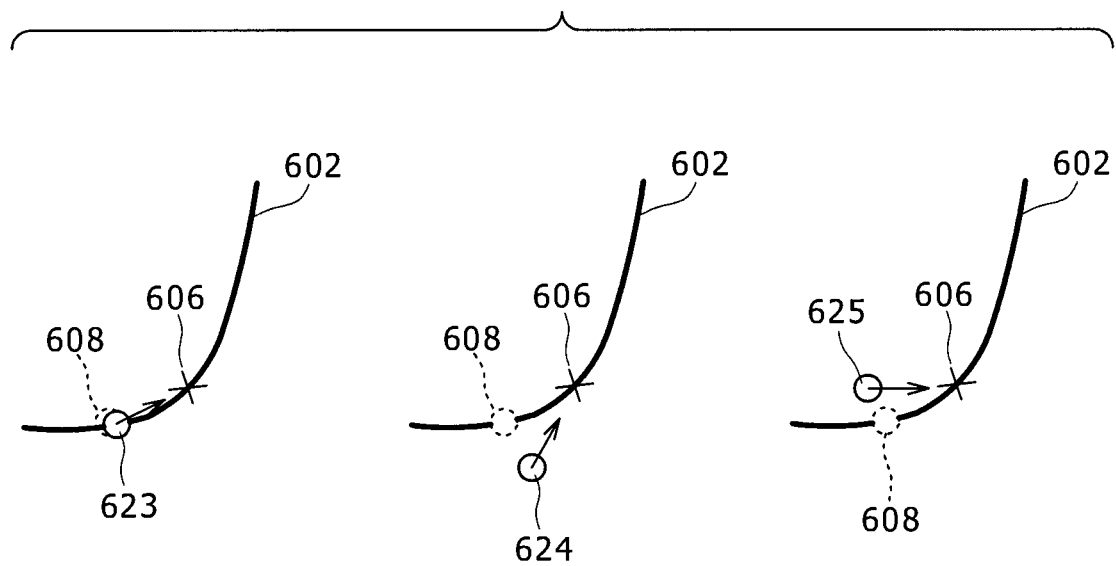
FIG. 8 is an explanatory diagram of data processing to be performed by a movement control data calculating section.

Using the position-posture data thus estimated and movement route data received from the computing system (6040) via a wireless LAN or the like, the movement control data calculating section (6128) in the mobile robot (220) determines movement control data indicating a direction of movement to be taken and other items for movement control. FIG. 8 shows an example of movement control data calculation. In FIG. 8, a movement route (602) indicates a preset movement route to be taken by the mobile robot (220), and a position (608) indicates a preset position at which the mobile robot (220) should be present on the movement route (602) at a certain time. Regardless of whether the mobile robot (220) is actually at a position (623) meeting the preset position (608) or at a different position (624) (or at a position (625)) due to any cause, the movement control data calculating section (6128) determines movement control data so that the mobile robot (220) will move to a preset marker point (606) which is located at a predetermined distance from the preset position (608) on the movement route (602).

In accordance with the movement control data thus determined, the mobile robot (220) actuates the robot moving section (6132) thereof to actually move along the movement route (602).

It is to be noted that the movement route data may be sent from the computing system (6040) to the mobile robot (220) as a data item corresponding to an entire movement route having a predetermined length or as a plurality of successive data items each corresponding to a partial path having a segmented length included in the entire movement route.

Then, the following describes data processing to be carried out by the computing system (6040) shown in FIG. 7. The computing system (6040), which is located outside the mobile robot (220), serves to mainly carry out preparatory tasks required before operation of the mobile robot (220). The computing system (6040) includes an environmental map generating section (6000), a movement route data creating section (6004), a predictive collision probability parameter calculating section (6008), and other sections.

The environmental map generating section (6000) is provided for generating environmental maps necessary for movements of the mobile robot (220). Although it is possible to create environmental maps automatically or semi-automatically by using sensing data measured through the sensor (210) (distance sensor) equipped on the mobile robot (220), the following describes a procedure for interactively creating environmental maps by actually measuring configurations of objects present in an environment.

Figure 9A:
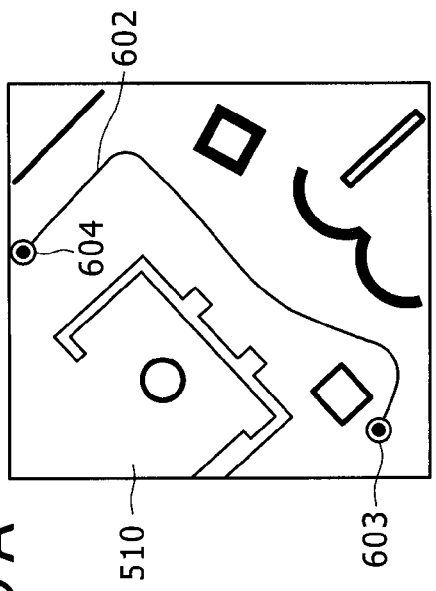
FIGS. 9A to 9D are diagrams showing an interactive processing operation for setting up movement route data.

The movement route data creating section (6004) is provided for creating movement route data automatically or interactively. An example of movement route data creation is described below with reference to FIGS. 9A to 9D. In FIG. 9A, there is shown a completed representation of movement route data. On an environmental map (510), a curved line (602) extending from a start point (603) to a goal point (604) is to be formed for the mobile robot (220). It is required that the curved line (602) should be determined so that the mobile robot (220) can move therealong.

Figure 9D:
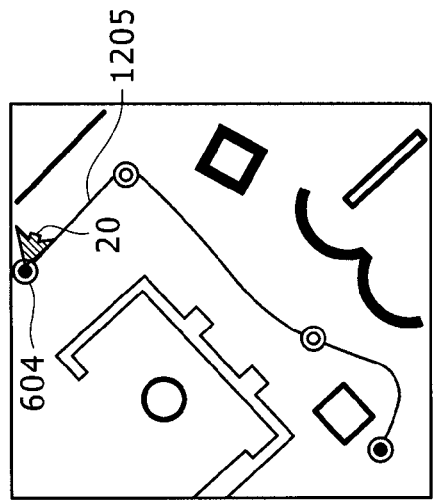
Figure 9C:
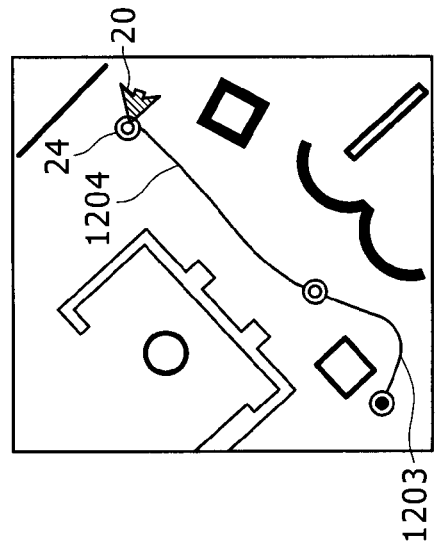
Figure 9B:
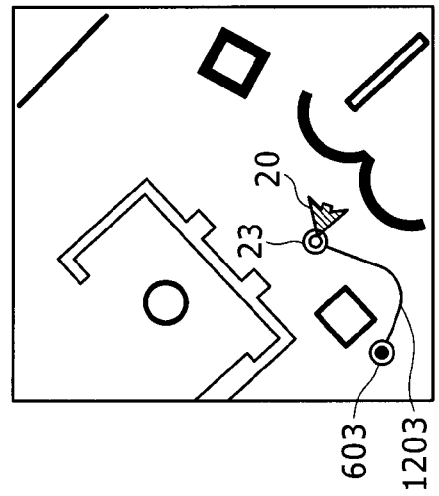

An exemplary procedure for creating the curved line (602) is illustrated in FIGS. 9B to 9D. As shown in FIG. 9B, an environmental map of interest is presented on screen. Using a mouse pointer (20) or the like, an operator specifies the start point (603) and a first intermediate marker point (23) on the environmental map. These and other points to be specified for mobile robot positioning are referred to as "control points". The movement route data creating section (6004) calculates a path to be formed between the two control points (start point and first intermediate marker point) so that the mobile robot (220) will keep a certain safe distance from environmental objects to avoid collision therewith during movement operation. As a practical calculation technique for this purpose, the "Basic Planning Technique" described in the document "Introduction to Intelligent Robots" (in Japanese), published by Corona Publishing Co. Ltd., 2001, ISBN 4-339-04553-5, pp. 11-82, is applicable for example.

After a partial path (1203) extending from the start point (603) to the first intermediate marker point (23) is thus formed, similar operational and processing steps are repeated (FIGS. 9B and 9C). A partial path (1204) extending from the first intermediate marker point (23) to a second intermediate marker point (24) is formed, and then a partial path (1205) extending from the second intermediate marker point (24) to the goal point (604) is formed. By connecting these partial paths, the curved line (602) shown in FIG. 9A is created as a movement route.

In creation of a movement route, it is advantageous to form individual partial paths each having a segmented length as mentioned above. That is, by forming individual partial paths, the formation of an unintended path in the movement route of interest can be avoided, or where the movement route is considerably long, it is possible to circumvent a problem of a momentary significant increase in computing time. Further, partial paths that have been formed are reusable in some cases of creation of different movement routes. Still further, in a situation where a total path (movement route) extending from the start point (603) to the goal point (604) is long, i.e., a long computing time is required, individual partial paths included in the movement route can be transmitted to the mobile robot (220) as successive items of movement route data, thereby making it possible to smoothly control movements of the mobile robot (220).

Figure 10:
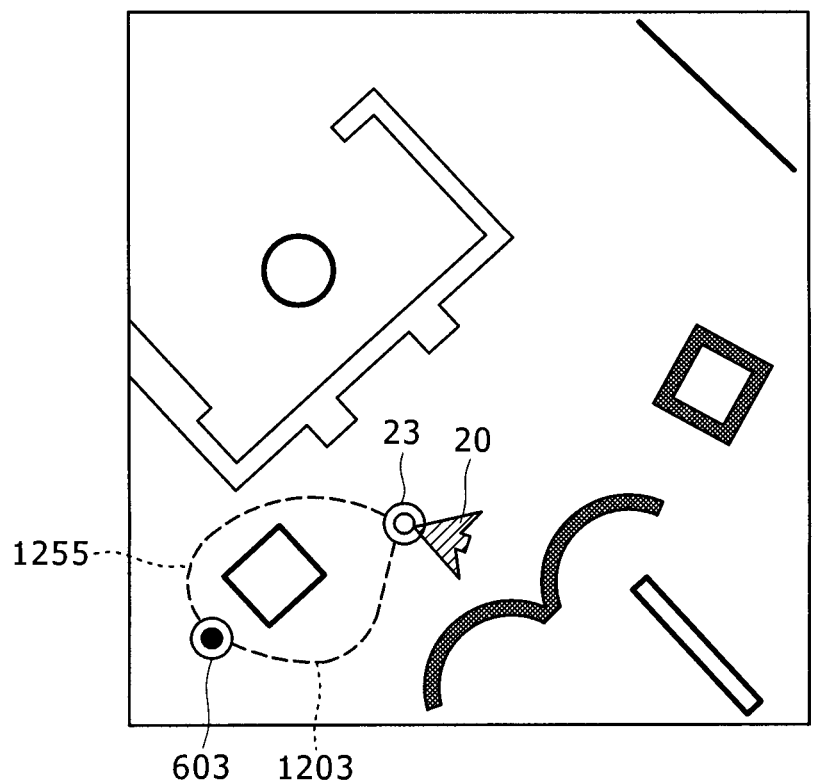
FIG. 10 is a diagram showing an example in which a plurality of candidate paths are calculated.

It is to be noted that a path formed to connect two control points in the above processing is not always unique. As shown in FIG. 10, between a first control point (603) and a second control point (23), a plurality of candidate paths are calculated; a first path (1203) and a second path (1255), for example. In this case, it is required to determine which selection method should be made effective. For example, an automatic selection method for selecting a path having the shortest distance or a selection method for manually selecting a path by the operator should be determined.

Figure 11:
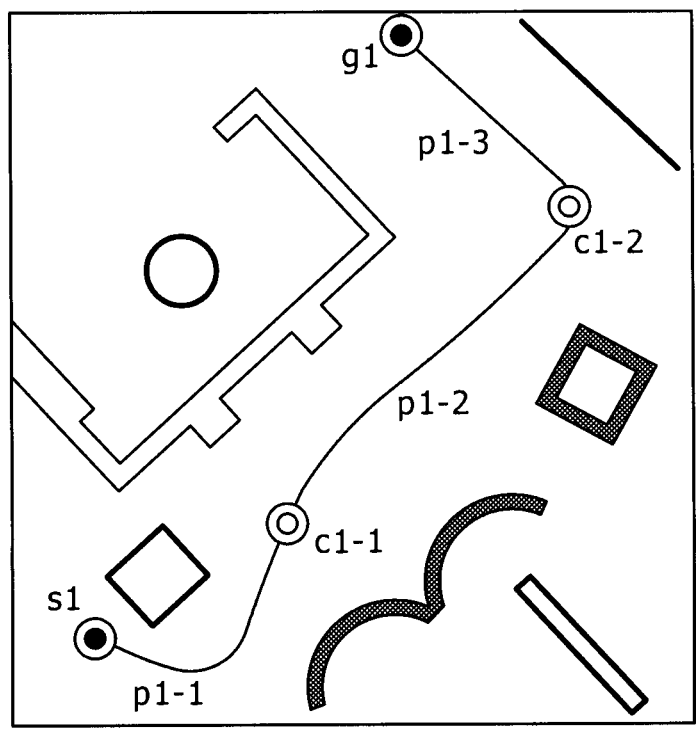
FIG. 11 is a diagram showing an exemplary user interface for interactively setting up movement routes.

As shown in FIG. 11 illustrating an exemplary interactive user interface, identification codes such as s1, g1, c1-1, c1-2, p1-1, p1-2, and pi-3 may be assigned to a start point, a goal point, two control points corresponding to intermediate marker points, and three partial paths connecting these points in creation of a movement route, for example. Using these identification codes, individual points and paths can be managed. More specifically, in management of individual points and paths, the operator shifts each control point on screen by mouse dragging, and accordingly, a path connected to the control point is automatically redrawn. In another case, one of a plurality of curved-line paths extending between two control points is selected as described above. Thus, the management of individual points and paths is carried out based on the above-mentioned procedure for forming a partial path extending between two control points.

In the movement route data crating section (6004) shown in FIG. 7, movement route data is created as exemplified above. If sensor (sensing) operations and mobile robot control operations are ideally performed with no error, autonomous movement control of the mobile robot (220) can be realized by using the above-described means included in the mobile robot (220) and the computing system (6040). However, in practical applications, there arises a problematic possibility of collision of the mobile robot (220) with an environmental object due to errors in sensor (sensing) operations, errors in robot movement control operations, or any adverse effects attributable to the configuration of the mobile robot (220). To minimize this problematic possibility, the predictive collision probability parameter calculating section (6008) is provided in the computing system (6040) as shown in FIG. 7. The predictive collision probability parameter calculating section (6008) is described below in detail.

Referring to FIG. 7, the predictive collision probability parameter calculating section (6008) includes a sensing simulator (120), a position-posture estimating simulator (124), a movement control data calculating simulator (128), a robot movement simulator (132), and a collision probability calculating section (140).

Figure 1:
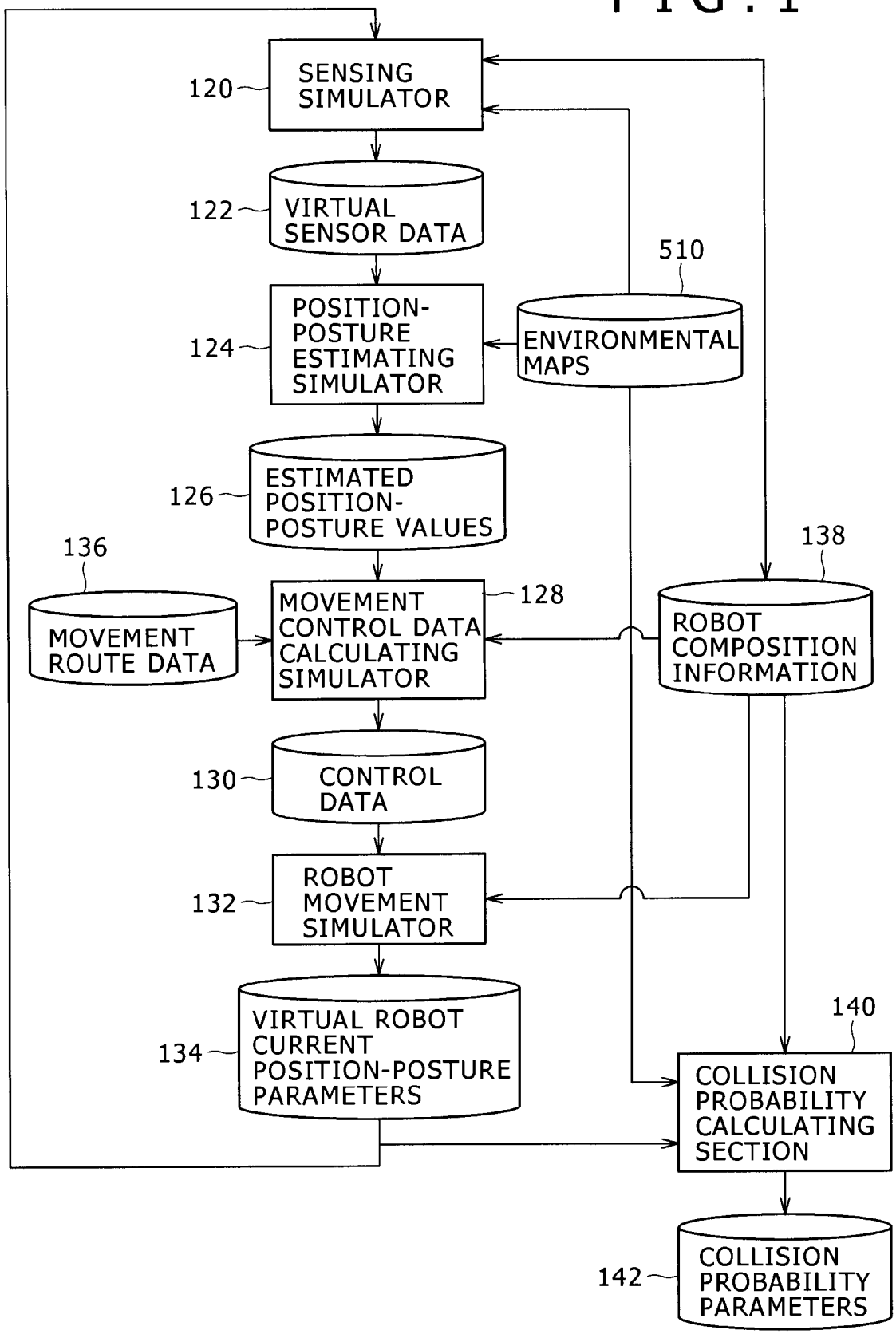
FIG. 1 is a diagram showing the mutual relationships of respective members of a predictive collision probability parameter calculating section.

FIG. 1 shows the mutual relationships of respective members included in the respective members included in the predictive collision probability parameter calculation section (6008). The sensing simulator (120) is used to simulate sensing operations of the sensor (210) equipped with the actual mobile robot (220). As shown in FIG. 1, using virtual robot current position-posture parameters (134) (virtual mobile robot position-posture state), environmental maps (510), and robot composition information (138) as input data, the sensing simulator (120) outputs virtual sensor data (122). The virtual robot current position-posture parameters (134) indicate the current position-posture state of a virtual robot in virtual robot movement simulation which is performed in the computing system (6040) shown in FIG. 7. These parameters are calculated by the robot movement simulator (132) to be described later. For the sake of avoiding confusion in the following description, the term "position-posture data" is used for the actual mobile robot (220), and the term "position-posture parameter" is used for the virtual mobile robot, though these terms represent a robot position-posture state equivalently.

The robot composition information (138) is a set of information concerning the structural arrangement of the mobile robot and the characteristics of component elements thereof, including information on robot configuration, physical dimensions, drive mechanism structure and characteristics, drive device specifications, sensor characteristics and mounting position, robot movement control algorithms and error models, sensing parameters and sensor error models, etc. These items of information are predefined according to mobile robot design specifications, component element specifications, and experimental measurement data or actual measurement data of errors or variations.

Figure 12B:
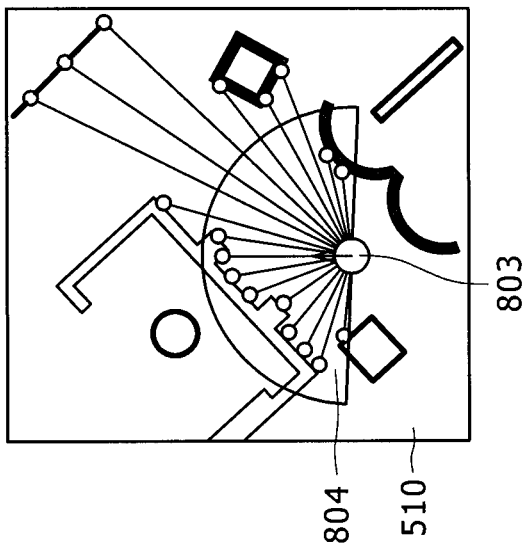
FIGS. 12A to 12C are diagrams showing an example of data processing to be performed by a sensing simulator.
Figure 12C:
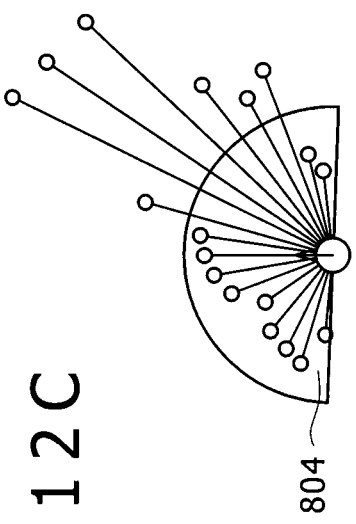
Figure 12A:
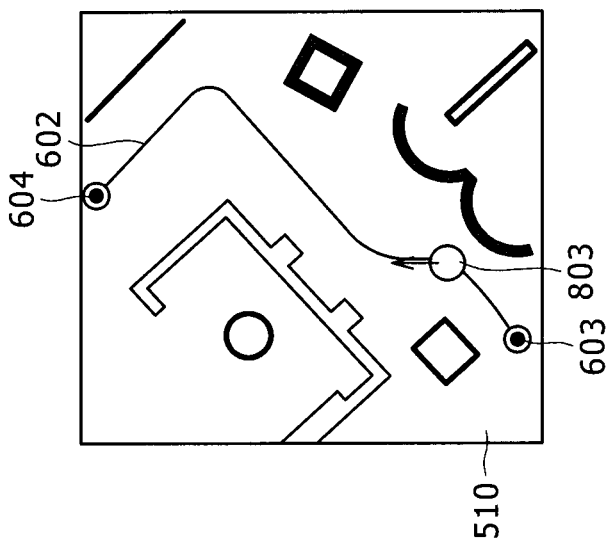

In FIGS. 12A to 12C and FIG. 13, there are shown examples of data processing to be performed by the sensing simulator (120). In FIG. 12A, the open circle "○" (803) indicates the current robot state in movement simulation, i.e., the current position-posture state of the virtual robot. According to sensor specifications defined in the robot composition information (138), the sensing simulator (120) calculates sensor information under the condition of a given environmental map (510). FIG. 12B shows how a distance to an object at each azimuth angle is calculated from the environmental map (510). An example of sensor information thus calculated (804) is shown in FIG. 12C.

Figure 13:
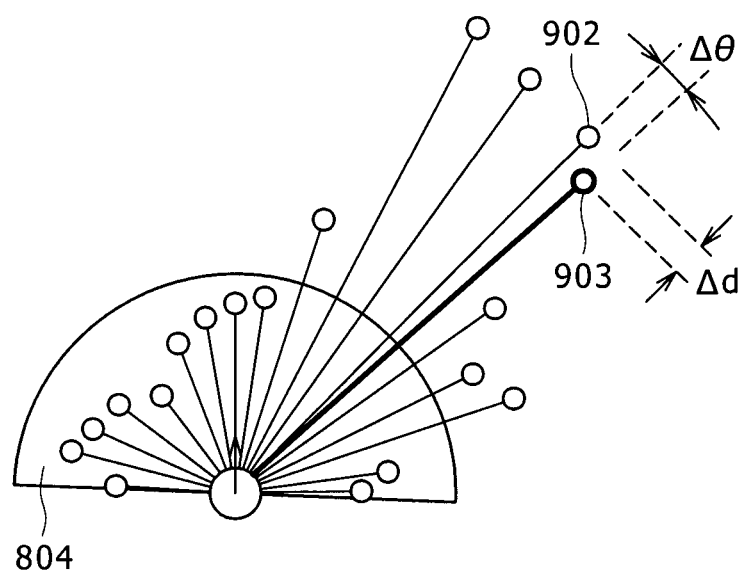
FIG. 13 is a diagram showing another example of data processing to be performed by the sensing simulator.

By way of contrast, virtual errors are added as shown in FIG. 13. That is, an error $\Delta\theta$ in direction and an error $\Delta d$ in distance are added to a sensor data component (902) obtained through the processing exemplified in FIGS. 12A to 12C. Thus, a sensor data component (903) including the errors is calculated. The values of the errors $\Delta\theta$ and $\Delta d$ to be used in this calculation are determined according to sensor error model information contained in the robot composition information (138) shown in FIG. 1; more specifically, the values of the errors $\Delta\theta$ and $\Delta d$ are determined on the basis of random number selection in error probability distribution modeling.

Then, the position-posture estimating simulator (124) shown in FIG. 7 is described below. The position-posture estimating simulator (124) is provided for carrying out data processing in the simulation of that in the position-posture estimating section (6124) incorporated in the actual mobile robot (220) shown in FIG. 7. While the actual mobile robot (220) uses the actual sensing section (6120) for input data acquisition thereof, the position-posture estimating simulator (124) receives virtual sensor data calculated by the sensing simulator (120). To be more specific, using the virtual sensor data (122) and the environmental map (510) as input data as shown in FIG. 1, the position-posture estimating simulator (124) carries out position-posture estimation to output an estimated position-posture value (126). Thus, in the computing system (6040) shown in FIG. 7, the current position-posture state of the virtual robot in virtual robot movement simulation is determined based on the virtual sensor data (122).

Then, the movement control data calculating simulator (128) shown in FIG. 7 is described below. The movement control data calculating simulator (128) is provided in the computing system (6040) for carrying out data processing in the simulation of that in the movement control data calculating section (6128) incorporated in the actual mobile robot (220) shown in FIG. 7. In the actual mobile robot (220), output data thereof is fed to the robot moving section (6132) including actual motor control devices. In contrast, the movement control data calculating simulator (128) feeds output data thereof to the robot movement simulator (132) to be described later. To be more specific, using input data including the estimated position-posture value (126) calculated by the position-posture estimating simulator (124), movement route data prepared separately (136), and the robot composition information (138) as shown in FIG. 1, the movement control data calculating simulator (128) calculates a direction of movement to be taken and other movement control items, which are output as control data (130). This processing is carried out in the same manner as in the movement control data calculating section (6128) described above.

Then, the robot movement simulator (132) shown in FIG. 7 is described below. The robot movement simulator (132) is provided in the computing system (6040) for carrying out simulation of physical movements of mechanisms included in the robot moving section (6132) incorporated in the actual mobile robot (220) shown in FIG. 7. To be more specific, using input data including the control data (130) calculated by the movement control data calculating simulator (128) and the robot composition information (138) as shown in FIG. 1, the robot movement simulator (132) outputs parameters regarding the position and posture to be taken by the actual mobile robot (220) through control thereof as the virtual robot current position-posture parameters (134).

The word "current" in the term "virtual robot current position-posture parameters" (134) indicates a point of time on completion of the movement of interest, i.e., the concept of the current time is used in terms of updating. In conceptual updating with respect to the current time, iterative processing is performed as shown in FIG. 1. In practice of calculation of the virtual robot current position-posture parameters (134), it is required to conduct pre-experiments or pre-measurements with inclusion of probabilistic factors on mutual relationships of elements such as motors and control signals, e.g., mutual relationship between a control signal applied to a motor and a robot movement driven by the motor. The mutual relationships thus obtained are recorded as items in the robot composition information (138). The above-noted phrase "with inclusion of probabilistic factors" signifies such a condition that, with respect to a certain control signal input, a position to be taken as the result of movement at the time of output is not uniquely determined but is determined in a form represented by probability distribution indicating a certain range of extent, for example.

More specifically, in a situation where control signal A is input, a position (x, y) to be taken as the result of movement may be calculated to be (10.0, 10.0) or (12.0, 11.0). This means that the position to be taken is randomly determined according to an error probability model formed through pre-experiment or pre-measurement using the actual mobile robot (220). In error probability modeling, a method of inputting a certain value just once to determine an output value is not used, but a certain value is input repeatedly as many times as required, e.g., 1,000 times, 10,000 times, and so forth, for output value determination. Thus, it becomes possible to indicate a tendency of movement to a particular kind of position, or a possibility of movement to a particular kind of position though the level of predictive probability concerned is relatively low. A technique of generating random numbers corresponding to errors or variations and repeating a multiplicity of trial examinations to determine system behaviors in terms of probability is well known as the Monte Carlo method in the art of numerical simulation. The above-mentioned method is also implemented based on the Monte Carlo method, for example.

Then, the collision probability calculating section (140) shown in FIG. 7 is described below. The collision probability calculating section (140) is provided for outputting a numerical value of a collision probability parameter (142) representing a possibility of collision with an object on an environment map in virtual robot movements determined by the robot movement simulator (132) described above. To be more specific, using input data including the environmental map (510), the virtual robot current position-posture parameters (134), and the robot composition information (138) as shown in FIG. 1, the collision probability calculating section (140) calculates a numerical value indicating a level of predictive probability of collision with an object. The environmental map (510) is used as position and configuration information regarding each object, and the robot composition information (138) is used as configuration information regarding the mobile robot for judgment on whether the mobile robot is to collide with an object when moved to a certain position.

Figure 14:
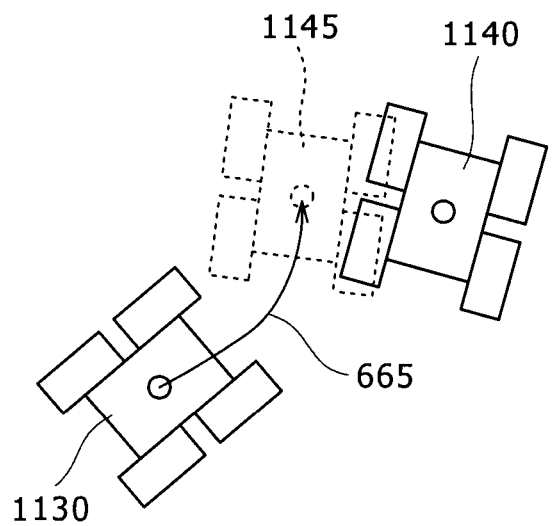
FIG. 14 is a diagram concerning an example of robot configuration information at the time of a movement performed with inclusion of a control error.

FIG. 14 pertains to an example of robot configuration information to be used for the above judgment. In a situation where a certain mobile robot (1130) present at a certain position should be moved to a predetermined position (1145) by means of movement control (665), the mobile robot may go to another unanticipated position (1140) due to occurrence of a control error. Although the occurrence of a control error largely depends on control characteristics, a control error may be incurred as a result of an error in sensor (sensing) operation. In this case, the configuration information of the mobile robot is overlaid on an environmental map at the unanticipated position (1140). If an object is located within the coverage of the configuration information of the mobile robot, it is judged that a collision with the object will occur. The collision probability parameter (142) indicates a numerical value representing a predictive probability of collision with a static object in an environment at the time of robot movement control based on certain movement route data. In the definition of this parameter, "100.0" is indicated as a numerical value thereof if a collision with an object is inevitable regardless of whether an error occurs or not, and "0.0" is indicated as a numerical value thereof if there is no predictive probability of collision with an object even if an error occurs within a presumable range.

In practice of calculation of the collision probability parameter (142), a multiplicity of trial examinations are repeated in sensing and movement control simulations as in the above description of the sensing simulator (120) and the movement control data calculating simulator (128). Using errors generated at random in the repeated trial examinations, a variety of movement results are calculated, and according to each of the movement results, a judgment is formed on whether a collision with an object is to occur or not. Then, the number of possible collisions is represented as a percentage with respect to the total number of trial examinations. Thus, collision probability parameter calculation is performed to determine a level of predictive probability of collision with an object in a particular situation. In the manner mentioned above, a predictive probability of collision of the mobile robot (220) with an object is obtained as a numerical value of the collision probability parameter indicating a possibility of collision between the object and the virtual robot defined in the computing system (6040).

While the above description of the procedural flow with reference to FIG. 1 has been based on the presumption that sensing parameters are determined by the sensing simulator (120), this processing step of sensing parameter determination may be left out by using an estimated position-position value (126) as an equivalent value corresponding to the virtual robot current position-posture parameter (134), or by using the virtual robot current position-posture parameter (134) with inclusion of errors defined in the robot composition information (138). In this case, although sensing errors cannot be reflected exactly in the collision probability parameter (142) to be finally determined, it is allowed to satisfactorily accomplish an intended functional feature of indicating a substantially predictive possibility of collision with an object through robot movement simulation regarding certain movement route data (136).

Figure 15:
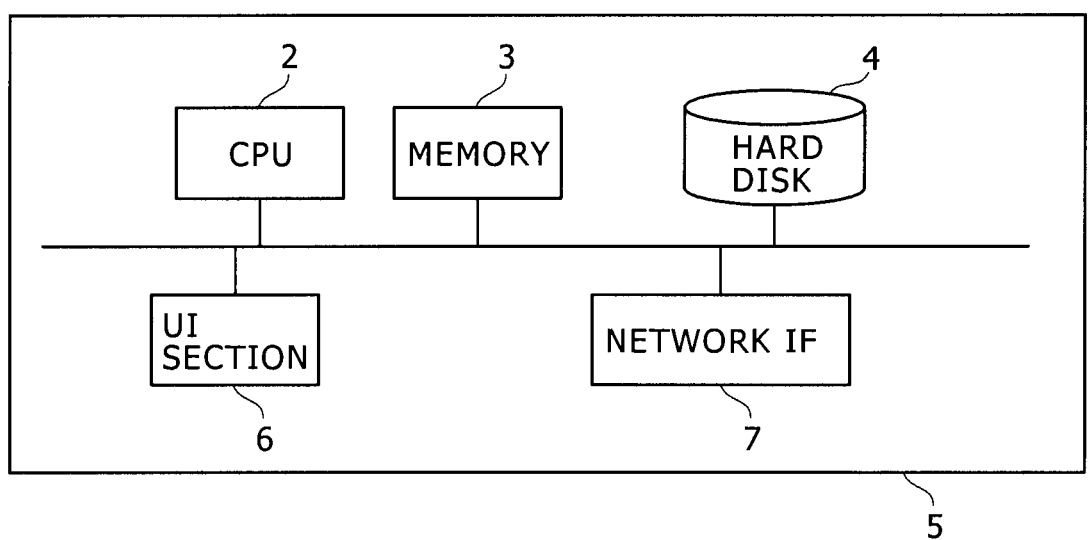
FIG. 15 is a diagram showing an exemplary hardware arrangement for implementing a computing system.

FIG. 15 shows an exemplary hardware arrangement for implementing the computing system (6040). The hardware of the computing system (6040) has a computer (5) including a CPU (2), a memory (3), a hard disk (4), a user interface (UI) section (6), and a network interface (IF) (7).

The CUP (2) runs according to programs stored in the hard disk (4) or the memory (3) to carry out each processing shown in FIG. 1. The UI section (6), which includes a keyboard, a display monitor, and a mouse, performs interactive processing with the operator. The network IF (7) provides interfacing to a wireless or wire communication channel for exchanging data with the mobile robot (220) shown in FIG. 7.

The relationships between these hardware components and the individual processing operations shown in FIG. 1 are described below. The processing operations of the sensing simulator (120), position-posture estimating simulator (124), movement control data calculating simulator (128), robot movement simulator (132), and collision probability calculating section (140) are performed by program execution on the CPU (2). The virtual sensor data (122), estimated position-posture value (126), control data (130), movement route data (136), virtual robot current position-posture parameter (134), robot composition information (138), and collision probability parameter (142) to be used for program execution are stored in the memory (3) and the hard disk (4). The interactive processing with the operator, described above and to be described below, is enabled through the UI section (6) with use of the mouse and display monitor thereof.

Figure 16:
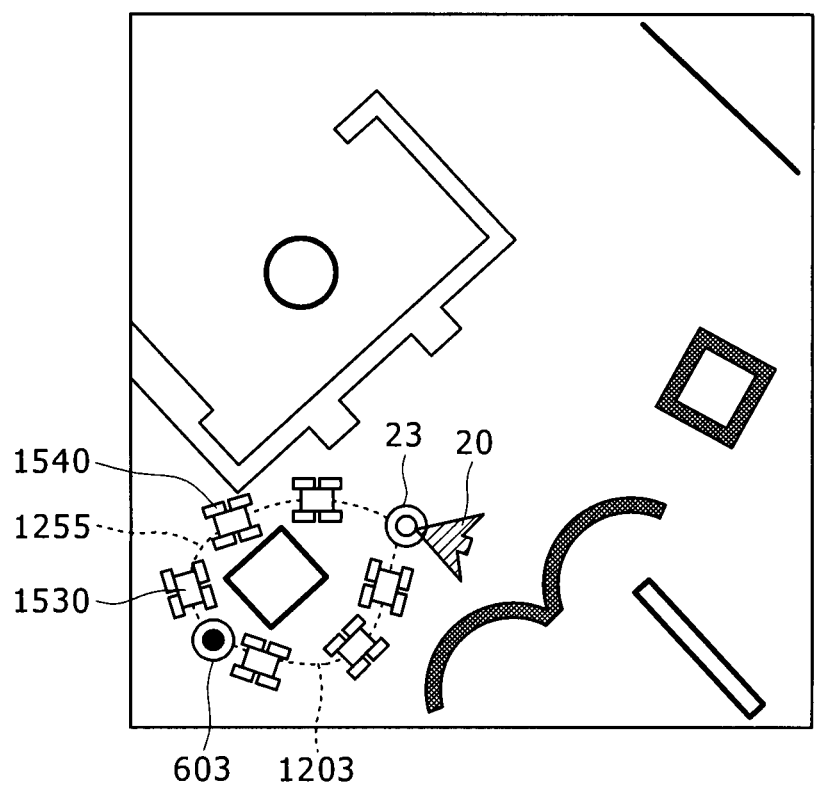
FIG. 16 is a diagram showing an exemplary situation in which there is a predictive probability of collision of a mobile robot with an object present on one of a plurality of candidate paths.

Then, the following describes exemplary applications of the collision probability parameter (142) mentioned above. In a first example of collision probability parameter application, the collision probability parameter is used for selecting one of a plurality of candidate paths as demonstrated in FIG. 10. In FIG. 10, there are two candidate paths from a control point (603) to a control point (23); a first candidate path (1203), and a second candidate path (1255). In this situation, as demonstrated in FIG. 16, assume that collision probability parameter calculation has resulted in the finding that a position (1540) on the second candidate path (1255) has a collision probability parameter value indicating a relatively high level of predictive probability of collision with an object. In this case, the operator is alerted to the high probability of collision in the vicinity of the position (1540) on the environmental map presented for movement route setting. Thus, the operator can interactively select the first candidate path (1203) indicating a relatively low level of predictive probability of collision.

Figure 17:
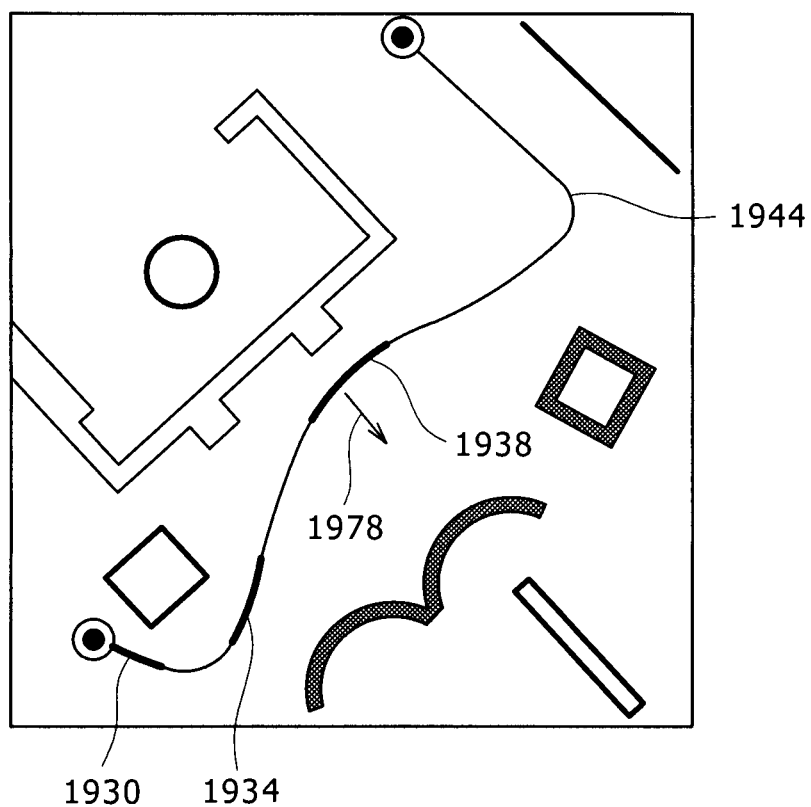
FIG. 17 shows an exemplary user interface that indicates curved movement paths having different line attributes according to collision probabilities on a movement route.
Figure 18:
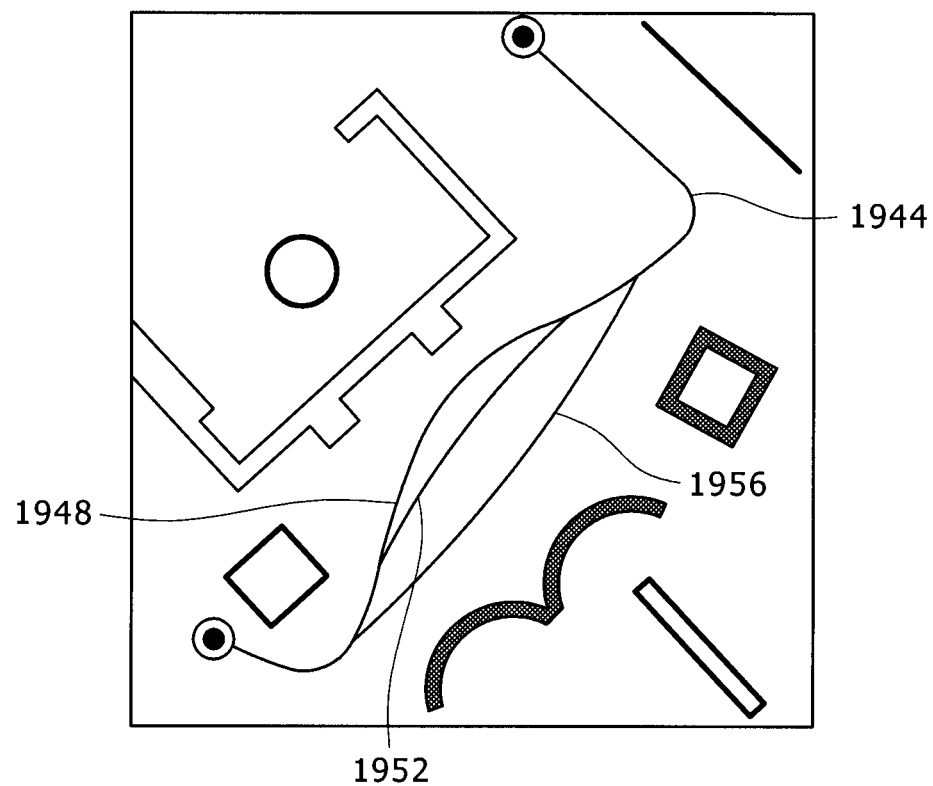
FIG. 18 is a diagram showing an exemplary user interface that indicates a plurality of candidate movement routes.

The user interface described above is implemented by using different path line attributes, e.g., different colors, thicknesses, and line types, according to collision probability parameter values at respective positions on each movement route. FIG. 17 shows an example of user interface on screen. In FIG. 17, thick-line segments (1930), (1934), and (1938) indicate a relatively high level of predictive probability of collision. On such a display screen as mentioned above, the operator interactively adjusts the segment (1938) in the arrow direction (1978), for example, to reduce the level of predictive probability of collision thereof. Alternatively, as shown in FIG. 18, there may be provided such an user interface arrangement that a plurality of candidate movement routes (1956), (1952), and (1948) are presented at the same time in advance, each candidate movement route being indicated with a particular color according to the level of predictive probability of collision thereof. Thus, the operator can select one of the candidate movement routes in an easy manner of interactive processing.

It is to be noted that a candidate point, path or route having a relatively low level of predictive probability of collision is not automatically determined in the above-mentioned operations. In practice, movement route selection is not always made according to only the level of productive probability of collision. There are a variety of practical determinant factors depending to operational conditions, e.g., a requirement for using a movement route having a shortest possible length, and a requirement for preferably using a movement route along an edge line of an object. In consideration of these determinant factors, interactive control by the operator is indispensable for proper movement route selection.

Figure 19A:
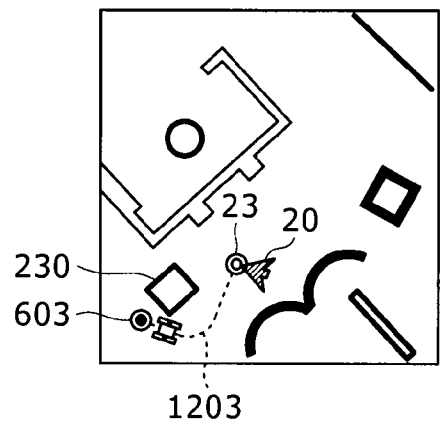
FIGS. 19A to 19E are explanatory diagrams showing an example of a countermeasure against an object having a protruded/indented part along the height direction thereof.

In a second example of collision probability parameter application, the collision probability parameter is used for coping with an object having a protruded/indented part along the height direction thereof as demonstrated in FIGS. 19A to 19E. In a situation where it seems that there is no problematic possibility of collision of the mobile robot (220) with an object (230) in movement along a certain path (1203) on an environmental map as shown in FIG. 19A, the actual probability of collision with the object (230) may be significantly high depending on the configuration of the object (230).

Figure 19B:
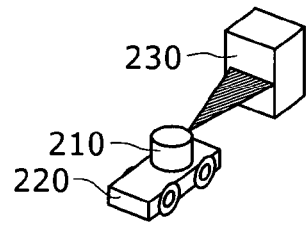
Figure 19C:
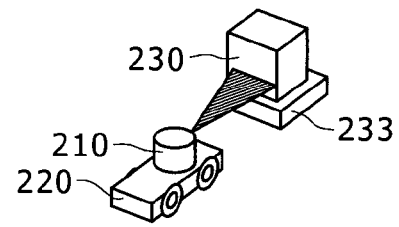
Figure 19D:
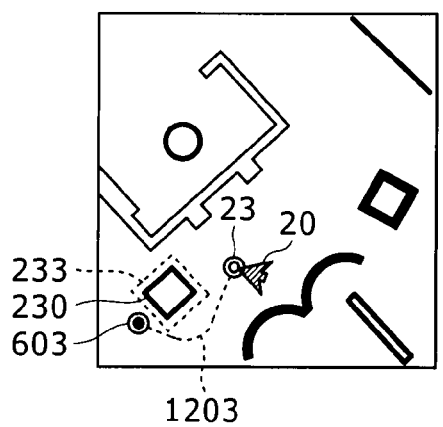
Figure 19E:
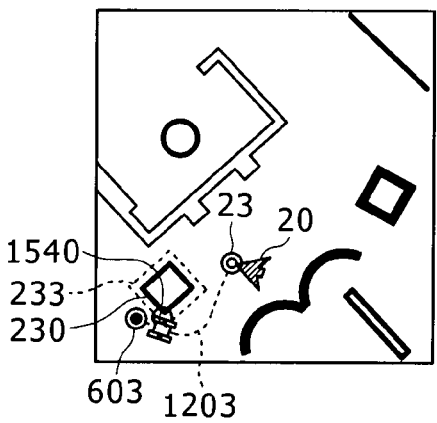

This condition is described below with reference to FIGS. 19B and 19C. Since the sensor (210) equipped on the mobile robot (220) performs sensing operation to check the configuration of an object on a cross section at a certain height level as described in the foregoing, it is to be noted that the configuration of an object indicated on an environmental map corresponds to the cross-sectional view thereof taken at the height level. In the case of an object (230) having no protruded/indented part along the height direction thereof (with respect to the cross-sectional configuration thereof as shown in FIG. 19B, the mobile robot (220) will not collide with the object (230) essentially unless an overlap is indicated between the images of the object and virtual robot (path) on the environmental map. However, if there is an object (230) having a protruded part (233) along the height direction thereof (with respect to the cross-sectional configuration thereof as shown in FIG. 19C, there is a possibility of collision of the mobile robot (220) with the protruded part (233) of the object (230). As a countermeasure against such a situation as mentioned above, information of an object regarding a protruded/indented part along the height direction thereof is preparatively embedded into the environmental map so that the collision probability calculating section (140) shown in FIG. 1 can form a judgment on a predictive probability of collision including a possibility of collision at each height level.

Using a mouse-driven graphic drawing function, the operator can interactively embed additional object information such as mentioned above into a prepared environmental map. Further, as shown by configurations (230) and (233) in FIG. 19D, protruded and indented forms can be specifically embedded with particular drawing attributes corresponding to different height levels in environmental map representation. As demonstrated in FIG. 19E, a predictive probability of collision can be calculated more accurately by checking any possible interference with individual objects indicated with particular drawing attributes thereof on the environmental map.

Figure 20A:
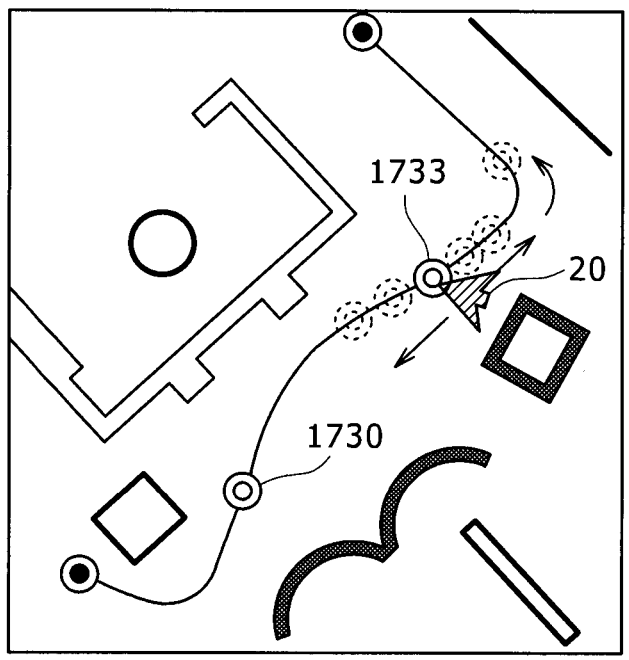
FIGS. 20A and 20B are diagrams showing an exemplary user interface for setting up movement speeds on a movement route.
Figure 20B:
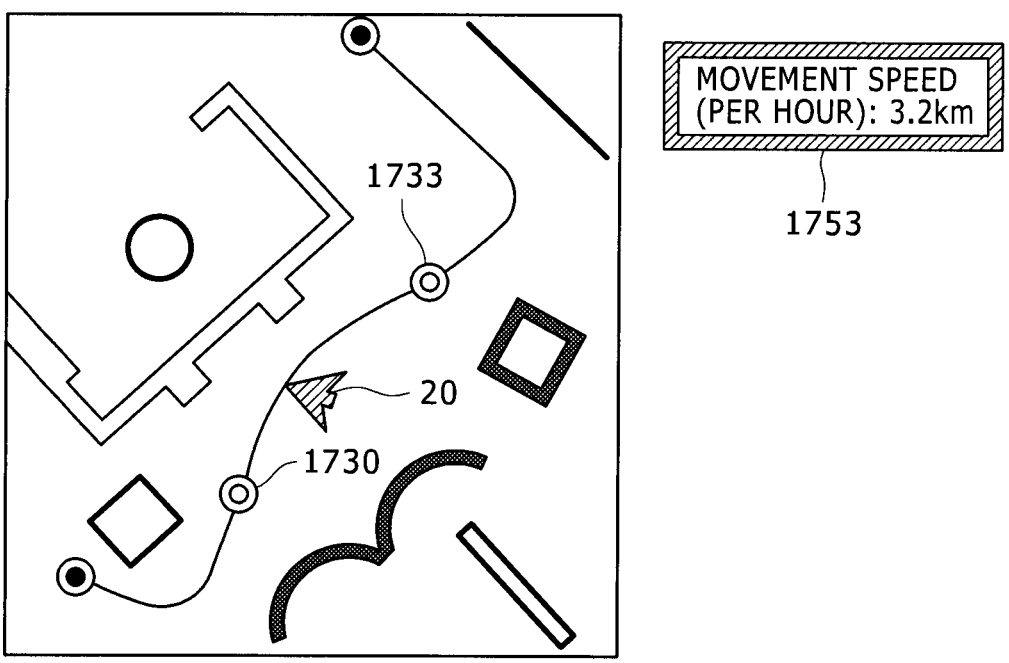

In a third example of collision probability parameter application, the collision probability parameter is used for setting up movement speeds of the mobile robot (220) as demonstrated in FIGS. 20A and 20B and FIGS. 21A and 21B. While the foregoing descriptions have been based on the presumption that only movement routes are to be set up for the mobile robot (220), it is also required to set up movement speeds of the mobile robot (220) in practical applications. For movement speed setting, the operator specifies an arbitrary path segment on the movement route of interest by using control points (1730) and (1733) that can be shifted by dragging with the mouse pointer (20) as shown in FIG. 20A. With respect to the path segment thus specified, the operator enters a numerical value of movement speed in a separately disposed text box (1753) or the like.

Figure 21B:
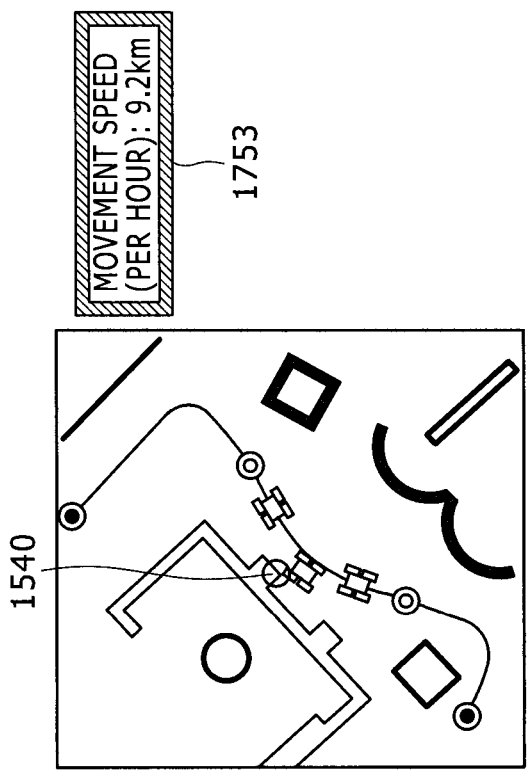
FIGS. 21A and 21B are diagrams showing an exemplary situation in which there occurs a change in collision probability on a movement route by changing a movement speed.
Figure 21A:
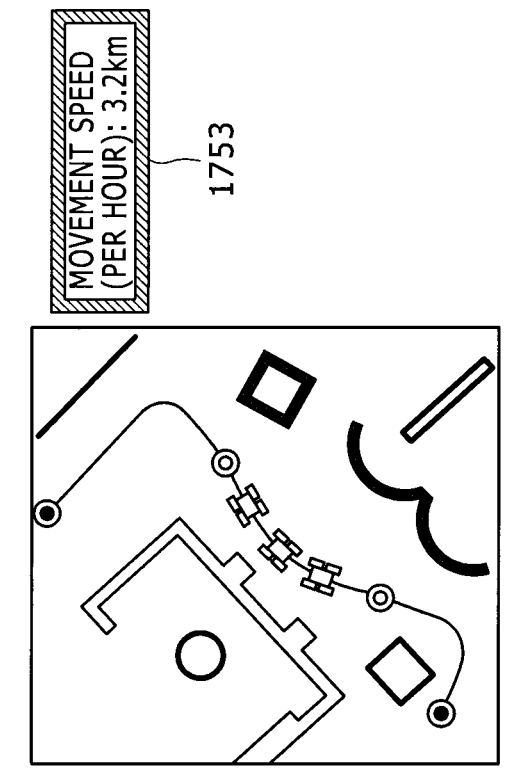

Using movement speed information specified in the above manner, the robot movement simulator (132) shown in FIG. 1 carries out simulation of movements of the mobile robot (220). In this robot movement simulation, a locus of robot movement may vary due to an effect of an inertial force or any other factor to be determined depending on a particular speed of movement. FIGS. 21A and 21B show how a robot movement varies depending on the condition of movement speed. FIG. 21A illustrates a simulated operation in which the virtual robot moves along a certain path segment at a speed of 3.2 km/hour, and FIG. 21B illustrates a simulated operation in which the virtual robot moves therealong at a speed of 9.2 km/hour. When a movement speed indicated in the text box (1753) is adjusted, a collision probability parameter value at the corresponding position changes accordingly. In FIG. 21B, the level of predictive probability of collision is high in the vicinity of a particular position (1540) on the environmental map presented for movement route setting or movement speed setting. In this case, the operator is alerted to the high probability of collision in the vicinity of the position (1540). Thus, there is provided a user interface arrangement through which the operator can interactively select a proper speed of movement having a relatively low level of predictive probability of collision. This kind of alerting indication can be implemented by changing a drawing attribute such as a line color of each path segment or each point on the movement route of interest, for example.

Figure 22:
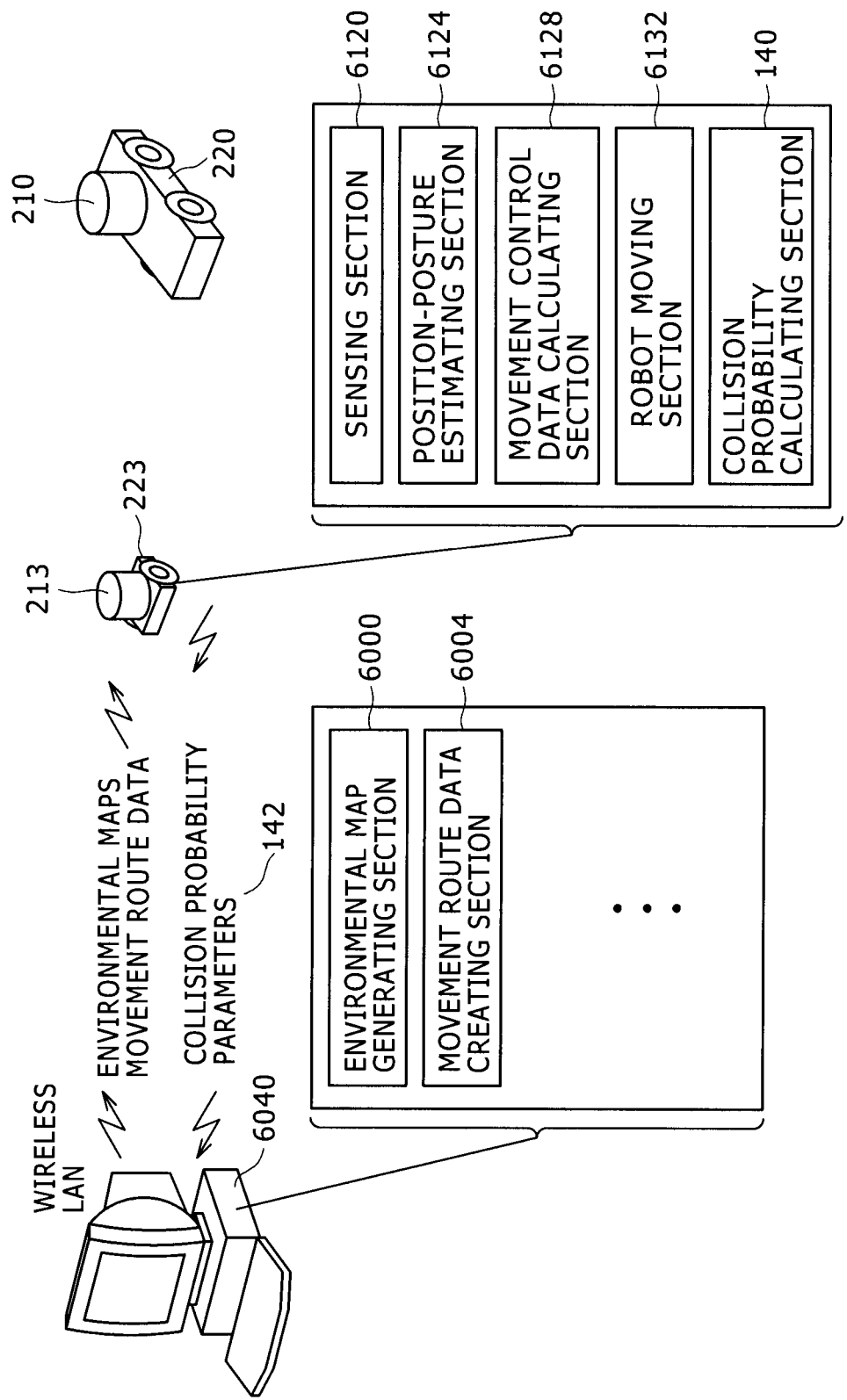
FIG. 22 is a diagram showing an autonomous mobile robot system configuration according to another preferred embodiment of the present invention.

Then, another preferred embodiment of the present invention is described below with reference to FIG. 22 which shows a diagram of an autonomous mobile robot system configuration. The autonomous mobile robot system configuration shown in FIG. 22 is based on the design concept that the data processing operations performed for predictive collision probability parameter calculation by the computing system (6040) shown in FIG. 7 are carried out by an actual mobile robot (223). To be more specific, in preparation of the mobile robot (223), a sensor (213) equivalent to the sensor of the mobile robot (220) shown in FIG. 7 is mounted on the mobile robot (223). It is to be noted that the mobile robot (223) should be structured to have a smaller size than that of the mobile robot (220) shown in FIG. 7.

The mobile robot of a small type (223) includes a computing system section that carries out predictive collision probability parameter calculation processing described with reference to FIG. 7 while conducting actual sensing operations and robot movement control operations. Even in a situation where the mobile robot (220) shown in FIG. 7 collides with an object, the mobile robot (223) has a lower level of possibility of actual collision with the object on account of the smaller size thereof. Hence, in a practical application, while determining respective collision probability parameter values on a movement route having the information that no collision will occur in use of the mobile robot (223) but a collision may occur in use of the mobile robot (220), the mobile robot (223) can be moved prior to movements of the mobile robot (220) for the purpose of pre-checking levels of collision probabilities on the movement route to be taken by the mobile robot (220).

As set forth hereinabove and according to the present preferred embodiments, before actual movement of the mobile robot, a simulation is performed using preparative robot-related information including the environmental map, movement route data, robot configuration information, sensor error (sensing error) model, and movement control error model, thereby providing sensing data including simulated errors to be checked at the time of actual movement. Further, using the sensing data including simulated errors thus obtained, another simulation is performed to examine what behaviors the mobile robot will take at the time of position-posture recognition processing during movement or robot movement control, thereby providing numerical value data in terms of predictive probability of collision with respective objects. Thus, it is allowed to make a changeover to a movement route having a relatively low level of predictive probability of collision with objects or to adjust robot movement control parameter values, e.g., to adjust a speed of movement on a particular path segment having a relatively low level of predictive probability of collision, resulting in contribution to significant reduction in the possibility of collision with objects in actual robot movements.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A method of using an autonomous mobile robot system, the autonomous mobile robot system comprising:
   a mobile robot; and
   a computing system; and
   the method comprising:
   measuring, using the mobile robot, surrounding conditions of the mobile robot;
   estimating, using the mobile robot, position-posture data from the measured surrounding conditions of the mobile robot and an environmental map;
   controlling, using the mobile robot, movements of the mobile robot according to movement control data determined from the position-posture data estimated and movement route data;
   generating, using the computer system, the environmental map indicating environmental geometric conditions including objects present in an environment where the mobile robot is to move around;
   creating, using the computer system, the movement route data for movements of the mobile robot in a coordinate scheme of the environmental map; and
   determining, using the computer system, a value of a collision probability parameter indicating a level of predictive probability of collision of the mobile robot with an object in mobile robot movements with inclusion of control errors through calculation by using robot composition information regarding the mobile robot, the environmental map prepared, and the movement route data created.

2. The method of claim 1, further comprising:
   stimulating, using the computer system, movements of the mobile robot with inclusion of control errors by using a virtual mobile robot corresponding to the mobile robot, the virtual mobile robot being virtually defined in the computing system; and
   determining, using the computer system, a value of a collision probability parameter indicating a level of predictive probability of collision of the virtual mobile robot with an object in virtual mobile robot movements determined by using the robot composition information, the environmental map, and the movement route data.

3. The method of claim 2, further comprising:
   calculating, using the computer system, control data of the virtual mobile robot from an estimated position-posture value indicating an estimated position-posture state on the environmental map, in combination with the movement route data, and the robot composition information;
   calculating, using the computer system, a value of a position-posture parameter of the virtual mobile robot from the control data calculated by the movement control data calculating simulator in combination with the robot composition information; and
   calculating, using the computer system, a value of the collision probability parameter of the virtual mobile robot from a value of the position-posture parameter calculated by the robot movement simulator, in combination with the environmental map, and the robot composition information.

4. The method claim 3, further comprising:
   calculating, using the computer system, virtual sensor data representing virtual definitions of the virtual mobile robot from a value of the position-posture parameter calculated, the environmental map, and the robot composition information; and
   outputting, using the computer system, an estimated position-posture value by using the virtual sensor data and the environmental map.

5. The method of claim 3, further comprising:
   calculating, using the computer system, a value of the collision probability parameter of the virtual mobile robot by using configuration information of the mobile robot contained in the robot composition information and configuration information of each object contained in the environmental map.

6. The method of claim 5, wherein the configuration information of each object contains information regarding a protruded/indented part along the height direction of the object.

7. The method of claim 3, further comprising:
   providing, using the computer system, an estimated position-posture value based on a value of the position-posture parameter calculated.

8. The method claim 3, wherein the computing system further comprises a user interface configured to allow an operator to conduct interactive processing; and the method further comprises:
  allowing the operator to interactively set up a movement route to be taken by the mobile robot on the environmental map through the user interface.

9. The method claim 8, further comprising:
  indicating, using the computer system, a path line included in a movement route of the virtual mobile robot on the environmental map according to the movement route data in a fashion such that the path line has at least one particular drawing attribute selected from a plurality of different drawing attributes including colors, thicknesses and line types in accordance with a value of the collision probability parameter calculated for the virtual mobile robot.

10. The method of claim 8, further comprising:
  when two points are specified on the environmental map by the operator through the user interface, forming a path connecting the two specified points so that the mobile robot keeps a certain safe distance from objects, and the path formed is used as data for a movement route to be taken by the mobile robot.

11. The method of claim 10, further comprising:
  when there are a plurality of candidate paths connecting the two specified points, presenting a candidate path having a collision probability parameter value indicating a relatively low level of predictive probability of collision as data for a movement route to be taken by the mobile robot.

12. The method of claim 3, wherein there is provided a small-type mobile robot that has a smaller size than that of the mobile robot and includes functional features of the computing system; and the method further comprises:
  measuring, using the small-type mobile robot, surrounding conditions of the small-type mobile robot;
  estimating, using the small-type mobile robot, a position-posture value of the small-type mobile robot from measured surrounding conditions of the small-type mobile robot and the environmental map; and
  controlling, using the small-type mobile robot, movements of the small-type mobile robot according to movement control data determined from the estimated position-posture value and movement route data.

13. The method of claim 12, further comprising:
  moving the small-type mobile robot prior to movements of the mobile robot.

14. A method of using an autonomous mobile robot system,
  the autonomous mobile robot system comprising:
  a mobile robot including a sensing section configured to measure surrounding conditions of the mobile robot, a position-posture estimating section configured to estimate a position and a posture of the mobile robot from sensing data obtained by the sensing section and an environmental map, and a robot moving section configured to control movements of the mobile robot according to movement control data determined from the estimated position and posture of the robot and movement route data; and
  a computing system including an environmental map generating section configured to generate the environmental map indicating environmental geometric conditions of an environment, in which the mobile robot is to move around and at least an obstacle exists;
  the method comprising steps of:
  creating, using the computer system, the movement route data for movements of the mobile robot in a coordinate scheme of the environmental map;
  simulating, using the computer system, the estimation performed in the position-posture estimating section by inputting virtual sensor data which includes sensing errors obtained on the basis of random number selection in error probability distribution modeling;
  simulating, using the computer system, the control performed in the robot moving section by inputting the result of simulation of the estimation to derive a result of a virtual control of the mobile robot in a form of probability distribution indicating a certain range of extent; and
  determining, using the computer system, a value of a collision probability parameter indicating a level of predictive probability of collision of the mobile robot with the obstacle from the result of the virtual control of the mobile robot.

15. The method of claim 14, wherein the step of simulating the control performed in the robot moving section includes steps of:
  calculating virtual control data of the mobile robot from the result of simulation of the estimation and the environmental map; and
  calculating the result of virtual control of the mobile robot on the basis of the calculated virtual control data of the mobile robot.

16. The method of claim 15, wherein the step of calculating the result of virtual control of the mobile robot includes deriving parameters regarding a position and a posture to be taken by the mobile robot as the result of the virtual control of the mobile robot according to an error probability model which is formed through pre-experiment using the mobile robot.

17. The method of claim 14, further comprising:
  calculating, using the computer system, a value of the collision probability parameter of the mobile robot by using configuration information of the mobile robot contained in a robot composition information and configuration information of each object contained in the environmental map.

18. The method of claim 17, wherein the configuration information of each object contains information regarding a protruded/indented part along the height direction of the object.

19. The method of claim 14, further comprising:
  providing, using the computer system, an estimated position-posture value based on a value of a position-posture parameter calculated.

20. The method claim 16, wherein the computing system further comprises a user interface configured to allow an operator to conduct interactive processing; and the method further comprises:
  allowing the operator to interactively set up a movement route to be taken by the mobile robot on the environmental map through the user interface.

21. The method claim 20, further comprising:
  indicating, using the computer system, a path line included in a movement route of a virtual mobile robot on the environmental map according to movement route data in a fashion such that the path line has at least one particular drawing attribute selected from a plurality of different drawing attributes including colors, thicknesses and line types in accordance with a value of the collision probability parameter calculated for the virtual mobile robot.

22. The method of claim 20, further comprising:

when two points are specified on the environmental map by the operator through the user interface, forming a path connecting the two specified points so that the mobile robot keeps a certain safe distance from objects, and the path formed is used as data for a movement route to be taken by the mobile robot.

23. The method of claim 22, further comprising:

when there are a plurality of candidate paths connecting the two specified points, presenting a candidate path having a collision probability parameter value indicating a relatively low level of predictive probability of collision as data for a movement route to be taken by the mobile robot.

24. The method of claim 14, wherein there is provided a small-type mobile robot that has a smaller size than that of the mobile robot and includes functional features of the computing system; and the method further comprises:

measuring, using the small-type mobile robot, surrounding conditions of the small-type mobile robot;

estimating, using the small-type mobile robot, a position-posture value of the small-type mobile robot from measured surrounding conditions of the small-type mobile robot and the environmental map; and controlling, using the small-type mobile robot, movements of the small-type mobile robot according to movement control data determined from the estimated position-posture value and movement route data.

25. The method of claim 24, further comprising:

moving the small-type mobile robot prior to movements of the mobile robot.

\* \* \* \* \*